United States Patent
Masuda (10) Patent No.: US 12,474,724 B2
(45) Date of Patent: Nov. 18, 2025

(54) SPOOL VALVE

(71) Applicant: IHI Corporation, Tokyo (JP)

(72) Inventor: Seiei Masuda, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/404,065

(22) Filed: Jan. 4, 2024

(65) Prior Publication Data

US 2024/0143001 A1 May 2, 2024

Related U.S. Application Data

(63) Continuation of application No. PCT/JP2022/033990, filed on Sep. 12, 2022.

(30) Foreign Application Priority Data

Sep. 17, 2021 (JP) .................... 2021-152171

(51) Int. Cl.
  *G05D 16/10* (2006.01)
  *F16K 11/07* (2006.01)
  *F16K 47/02* (2006.01)

(52) U.S. Cl.
  CPC ........ *G05D 16/101* (2019.01); *F16K 11/0712* (2013.01); *F16K 47/023* (2013.01)

(58) Field of Classification Search
  CPC .... G05D 16/101; G05D 16/10; F16K 47/023; F16K 11/0712
  See application file for complete search history.

(56) References Cited

U.S. PATENT DOCUMENTS

| | | | | |
|---|---|---|---|---|
| 4,368,872 A | * | 1/1983 | Machat | .................. G05D 16/10 251/324 |
| 5,004,015 A | * | 4/1991 | Amrhein | ............. F16K 11/0712 137/625.68 |
| 2010/0187451 A1 | * | 7/2010 | Vinski | .................. G05D 16/106 251/14 |

(Continued)

FOREIGN PATENT DOCUMENTS

| | | |
|---|---|---|
| EP | 0 076 664 A1 | 4/1983 |
| GB | 838839 A | 6/1960 |

(Continued)

OTHER PUBLICATIONS

Japanese Office Action issued Jan. 7, 2025 in Japanese Patent Application No. 2023-548451, 3 pgs.

(Continued)

*Primary Examiner* — Patrick C Williams
(74) *Attorney, Agent, or Firm* — Oblon, McClelland, Maier & Neustadt, L.L.P.

(57) ABSTRACT

A spool valve (1) includes: a sleeve (10) extending in an axial direction thereof, including an inlet port (11) and an outlet port for working fluid; a spool (20) movably housed in the sleeve (10) in the axial direction; a biasing device (30) including a spring (31) as a biasing member configured to press a base end (20a) of the spool (20) toward a tip end (20b) of the spool (20); and a pressure detecting port (56) for the working fluid, opening toward the tip end (20b) of the spool (20). The outlet port (12) is constituted of slits (16), and the slits (16) are arranged at intervals in the circumferential direction of the sleeve (10) and extended in the axial direction.

3 Claims, 6 Drawing Sheets

(56) References Cited

U.S. PATENT DOCUMENTS

| | | | |
|---|---|---|---|
| 2015/0252908 A1 | 9/2015 | Nagasaki et al. | |
| 2018/0355984 A1* | 12/2018 | Coretto | F16K 11/0712 |
| 2019/0322258 A1* | 10/2019 | Besliu | B60T 8/5043 |
| 2020/0096114 A1* | 3/2020 | Stetzer | F16K 11/044 |

FOREIGN PATENT DOCUMENTS

| | | |
|---|---|---|
| JP | 50-150832 U | 12/1975 |
| JP | 61-256082 A | 11/1986 |
| JP | 3-374 U | 1/1991 |
| JP | 2007-315605 A | 12/2007 |
| JP | 2015-169212 A | 9/2015 |

OTHER PUBLICATIONS

International Search Report issued Oct. 11, 2022 in PCT/JP2022/033990 filed on Sep. 12, 2022, 2 pages.
Extended European Search Report issued Jul. 7, 2025 in European Patent Application No. 22869922.9, 8 pgs.

* cited by examiner

CLOSED ⟵ AD ⟶ OPEN   ↕ RD

SPOOL VALVE

CROSS REFERENCE TO RELATED APPLICATIONS

This application is a continuation application of International Application No. PCT/JP2022/033990, now WO 2023/042775 A1, filed on Sep. 12, 2022, which claims priority to Japanese Patent Application No. 2021-152171, filed on Sep. 17, 2021, the entire contents of which are incorporated by reference herein.

TECHNICAL FIELD

The present disclosure relates to a spool valve.

BACKGROUND ART

The spool valve has a sleeve and a spool housed in the sleeve. The spool valve is a valve that opens and closes a flow passage by moving the spool. The sleeve is provided with a housing hole for the spool. An inlet port and an outlet port for working fluid is provided on the side surface of the sleeve. The spool has a land section (a large-diameter portion) having an outer diameter approximately equal to the diameter of the housing hole of the sleeve, and a groove section (small-diameter portion) recessed radially inward from the outer peripheral surface of the land section. The groove section has a width capable of connecting between the inlet port and the outlet port. The opening degree of the spool valve is adjusted depending on the position of the groove section in accordance with the movement of the spool.

When the spool valve is in an open state, the working fluid flows into the inlet port and is discharged from the outlet port through the groove section. Forces due to the flow of the working fluid act on the inner surface of the groove section near the inlet port and the outlet port. For example, when either the inlet port or the outlet port is throttled by the spool (in other words, if it is slightly open), a jet of the working fluid generated. If a pressure fluctuation caused by the jet breaks the balance between the aforementioned forces on an inlet port side and an outlet port side as described above, the spool generates forces in the axial and radial directions, respectively. These forces are generally referred to as flow forces (or fluid forces). Because the axial flow force acts in the direction of closing the valve, when the valve is open at a small opening degree, the working fluid tends to pulsate and the pressure control is likely to unstable. In this regard, JP 2015-169212 A discloses a spool type pressure control valve for suppressing this pulsation.

SUMMARY OF THE INVENTION

It is desirable that the pressure control valve and the flow control valve can ideally control the pressure of the working fluid at a constant level with respect to an increase or decrease in the flow rate of the working fluid. However, these valves have a so-called override property in which the pressure of the working fluid increases with an increase in the flow rate of the working fluid. The above-mentioned flow forces also affect this override property. For example, when the flow force increases, the ratio of the pressure change of the working fluid to the flow change of the working fluid increases, and it becomes difficult to control the pressure or flow rate.

An object of the present disclosure is to provide a spool valve capable of suppressing the influence of the flow force on the override property and being applied to a pressure control valve or a flow control valve.

A spool valve according to an aspect of the present disclosure includes: a sleeve extending in an axial direction thereof, including an inlet port and an outlet port for working fluid; a spool movably housed in the sleeve in the axial direction; a biasing device including a biasing member configured to press a base end of the spool toward a tip end of the spool; and a pressure detecting port for the working fluid, opening toward the tip end of the spool; wherein the outlet port includes slits; the slits are arranged at intervals in a circumferential direction of the sleeve and extend in the axial direction.

The outlet port may define an outer shape of the outlet port and may be formed in regions arranged at intervals in the circumferential direction. The outlet port may be sectioned into a first part and a second part located further from the inlet port than the first part, and a width of the first part of the sleeve along the circumferential direction may increase as it approaches the second part, and a width of the second part of the sleeve along the circumferential direction may be constant. The slits may be formed over the entire area in the circumferential direction at predetermined intervals in the circumferential direction.

According to the present disclosure, it is possible to provide a spool valve capable of suppressing the influence of the flow force on the override property and being applied to a pressure control valve or a flow control valve.

BRIEF DESCRIPTION OF DRAWINGS

FIGS. 4A and 4B are cross-sectional views of the spool valve, wherein

FIGS. 5A to 5C are plan views showing several examples of outlet ports as viewed from the radial direction, wherein

FIGS. 6A and 6B are diagrams showing numerical analysis results using Computational Fluid Dynamics (CFD) for the velocity distribution of a jet on a cross section including an axis, wherein

FIGS. 7A and 7B are diagrams showing numerical analysis results using CFD for the static pressure distribution in a groove section near an outlet port on a cross section orthogonal to an axis, wherein

DESCRIPTION OF EMBODIMENTS

Hereinafter, some embodiments of the present disclosure will be described. The same reference numerals will be used for common parts in each figure, and duplicate descriptions will be omitted. The spool valve according to the present embodiment can be applied as a pressure control valve or a flow control valve in an environment in which electric control is difficult, such as an aircraft fuel supply system, for example.

Figure 1:
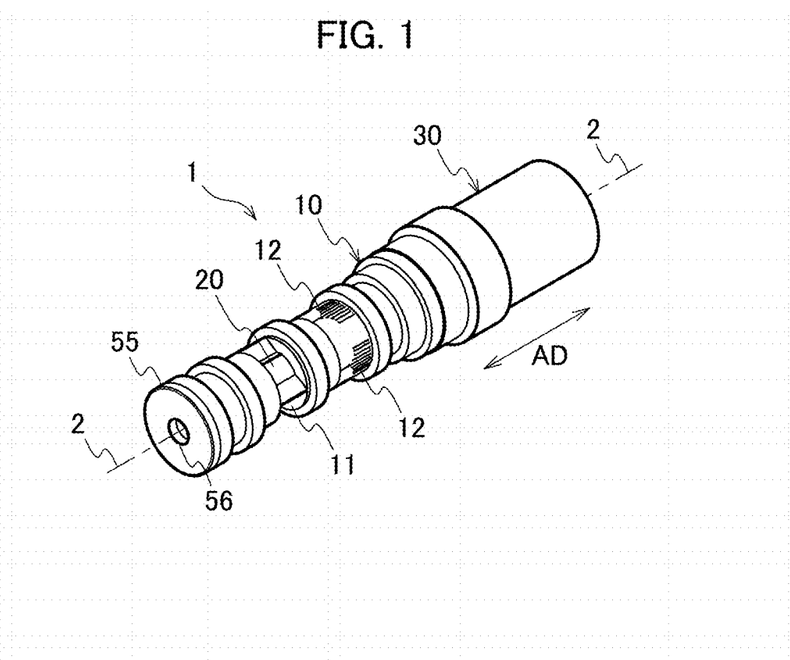
FIG. 1 is a perspective view of a spool valve according to an embodiment of the present disclosure.
Figure 2:
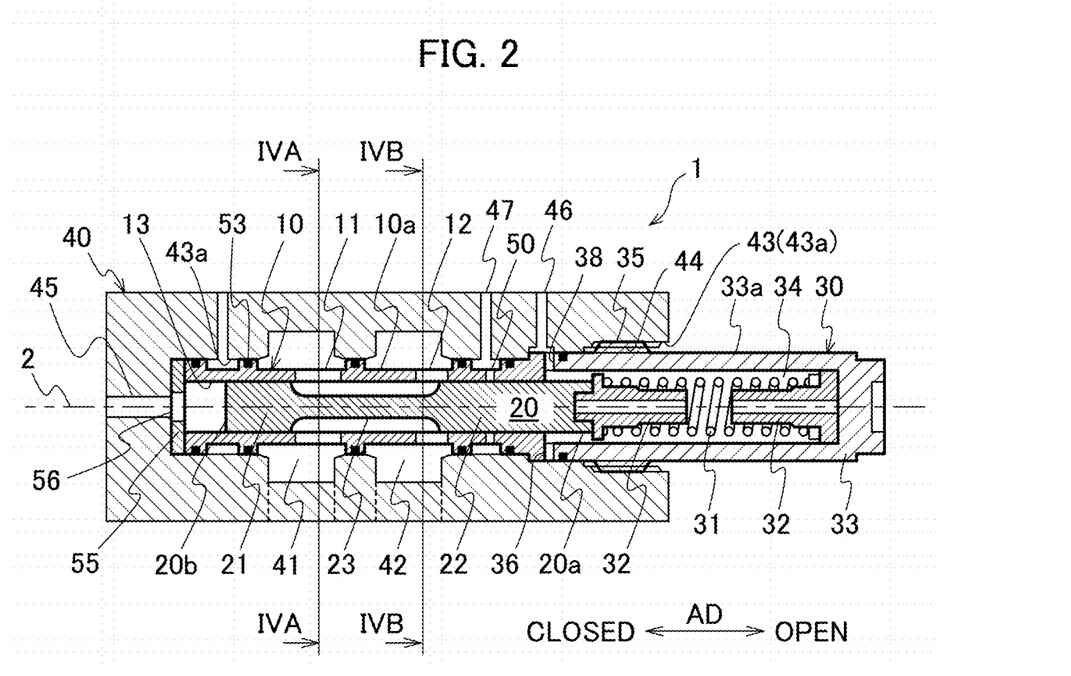
FIG. 2 is a cross-sectional view of the spool valve, the view including an axis.
Figure 3:
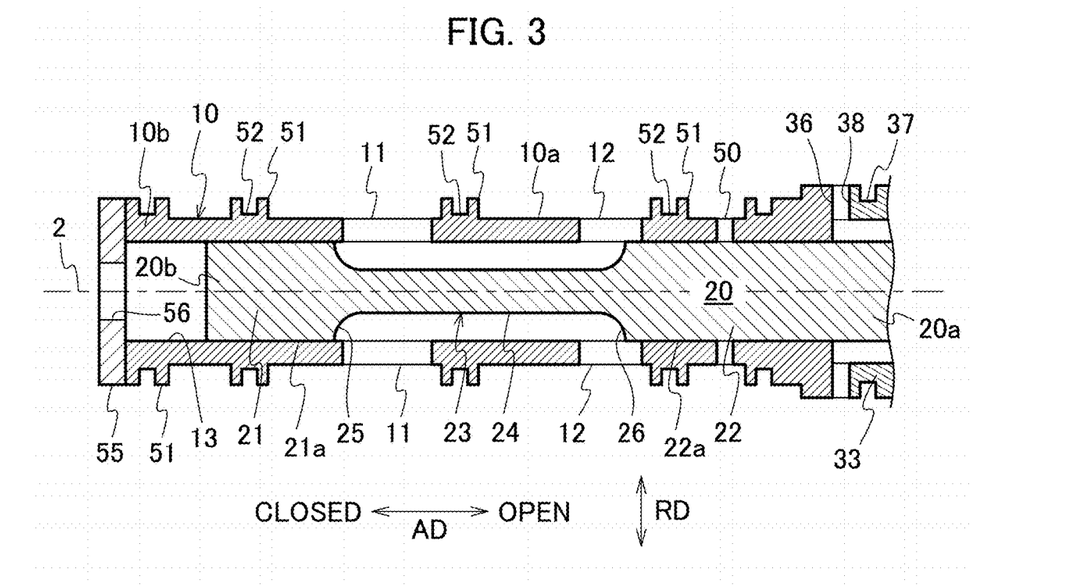
FIG. 3 is an enlarged cross-sectional view around a groove section of the spool shown in FIG. 2.
Figure 4A:
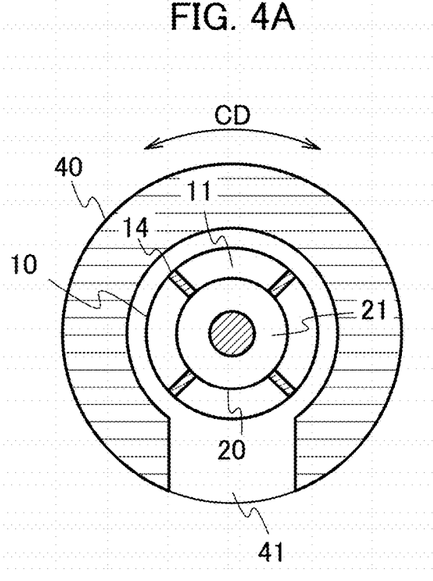
FIG. 4A is a cross-sectional view along the line IVA-IVA in FIG. 2.
Figure 4B:
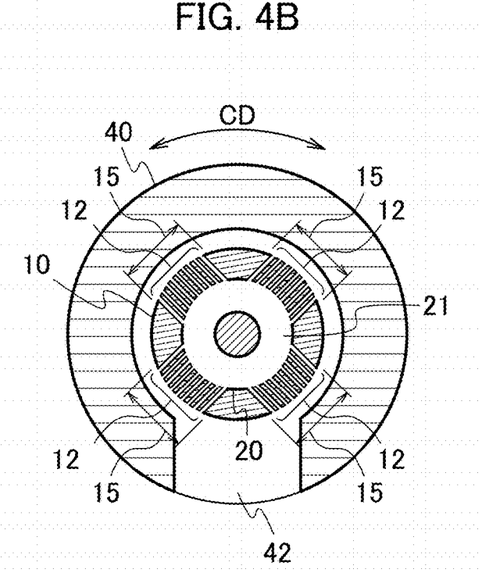
FIG. 4B is a cross-sectional view along the line IVB-IVB in FIG. 2.

A spool valve 1 according to the present embodiment will be described below. FIG. 1 is a perspective view of the spool valve 1. FIG. 2 is a cross-sectional view of the spool valve 1, the view including an axis 2. FIG. 3 is an enlarged cross-sectional view around a groove section 23 of a spool 20 shown in FIG. 2. FIGS. 4A and 4B are cross-sectional views of the spool valve 1, wherein FIG. 4A is a cross-sectional view along the line IVA-IVA in FIG. 2, and FIG. 4B is a cross-sectional view along the line IVB-IVB in FIG. 2.

For convenience of explanation, an extending direction of the axis 2 is referred to as an axial direction AD, and a circumferential direction and a radial direction around the axis 2 as the center are referred to as a circumferential direction CD and a radial direction RD, respectively. The axis 2 is a central axis of a sleeve 10 (described later) and a spool 20 (described later). A direction in which the spool 20 opens the outlet port 12 of the sleeve 10 (the right direction in FIG. 2) is called an opening direction, and a direction in which the spool 20 closes the outlet port 12 of the sleeve 10 (the left direction in FIG. 2) is called a closing direction. Both the opening direction and the closing direction are parallel to the axial direction AD.

As shown in FIG. 1, the spool valve 1 according to the present embodiment has a substantially cylindrical outer shape extending in the axial direction AD. The spool valve 1 includes a sleeve 10, a spool (piston) 20, and a biasing device 30. As shown in FIG. 2, for example, the spool valve 1 is inserted into a mounting hole 43 formed in a housing 40, and is attached to the housing 40.

First, the sleeve 10 will be described.

The sleeve 10 is a hollow cylindrical member extending in the axial direction AD. The spool 20 is movably housed in the housing hole 13 in the axial direction AD. The housing hole 13 is formed in the sleeve 10 and extends in the axial direction AD around the axis 2 as the center.

An inlet port 11 and an outlet port 12 are provided on the outer peripheral surface 10a of the sleeve 10. The inlet port 11 is an inlet for the working fluid. The inlet port 11 connects with an inlet passage 41 formed in the housing 40. As shown in FIG. 4A, the inlet port 11 has a predetermined width in the axial direction AD and is formed over the entire circumferential direction CD except where the ribs 14 are provided. The inlet port 11 is always connected with a groove section 23 of the spool 20.

The outlet port 12 is located between the inlet port 11 and a base end 20a of the spool 20. The outlet port 12 is an outlet for the working fluid. The outlet port 12 connects with an outlet passage 42 formed in the housing 40. As shown in FIG. 4B, the outlet port 12 is formed in regions 15 (see FIGS. 5A to 5C) arranged at intervals in the circumferential direction CD. Each region 15 defines the outer shape of the outlet port 12. The regions 15 are located at same intervals (e.g., every 90 degrees around the axis 2) along, for example, the circumferential CD.

The outlet port 12 will be described in detail.

Figure 5A:
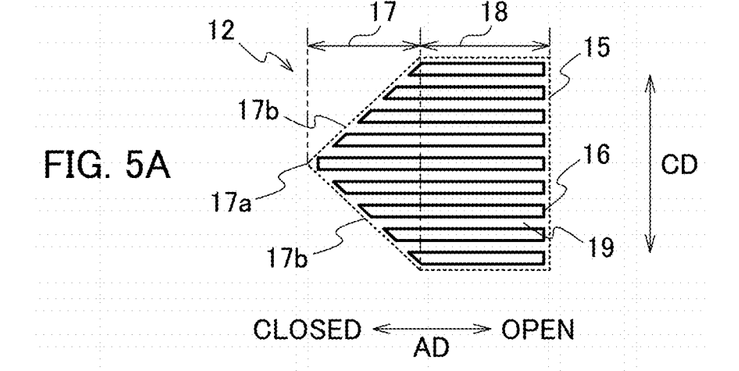
FIG. 5A shows a first example of an outlet port.
Figure 5B:
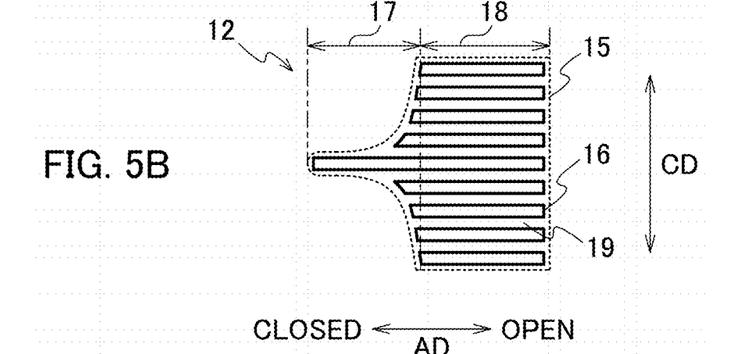
FIG. 5B shows a second example of an outlet port.
Figure 5C:
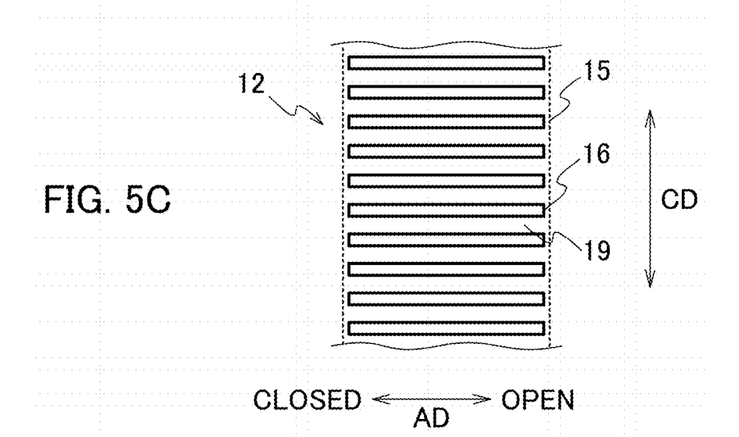
FIG. 5C shows a third example of an outlet port.

5A to 5C are plan views showing several examples of the outlet port 12 as viewed from the radial direction RD, wherein FIG. 5A shows a first example of the outlet port 12, FIG. 5B shows a second example of the outlet port 12, and FIG. 5C shows a third example of the outlet port 12. As shown in these figures, the outlet port 12 includes slits (slots, openings) 16. The slits 16 are arranged at intervals in the circumferential direction CD and extend in the axial direction AD in parallel with each other. The slits 16 are parallel to a plane which includes the axis 2 and extends in the radial direction RD (see FIG. 4B). Two adjacent slits 16 and 16 are separated by a rib 19 between them. The respective widths of slits 16 and ribs 19 in the circumferential direction CD may be equal or different from each other. The widths of the slits 16 may be constant or different from each other. The same applies to the widths of the ribs 19.

As shown in FIGS. 5A to 5C, the outlet port 12 is sectioned into a first part (first segment) 17 and a second part (second segment) 18. The first part 17 is located closer to the inlet port 11 than the second part 18. The second part 18 is located farther from the inlet port 11 than the first part 17.

In the development planes of FIGS. 5A and 5B, the outer shape of the first part 17 has an isosceles triangle or a similar shape thereof with a vertex 17a facing the inlet port 11. That is, the width of the first part 17 along the circumferential CD increases as it approaches the second part 18. The rate of increase in the width along the circumferential CD may be constant as shown in FIG. 5A, or may increase according to an exponential function or a function with an increase rate similar to the exponential function as shown in FIG. 5B. In the latter case, the outer shape of the first part 17 is curved toward the first part 17 (i.e., toward the inside of the second part) on the two sides 17b and 17b forming the apex angle as compared with the triangular outer shape shown in FIG. 5A.

On the other hand, in the development planes shown in FIGS. 5A and 5B, the outer shape of the second part 18 is rectangular with sides extending in the axial direction AD and the circumferential direction CD, respectively. That is, the width of the first part 17 along the circumferential direction CD is constant.

For the sake of explanation, the region 15 of the outlet port 12 shown in FIGS. 5A to 5C is enlarged outward from the region where the slits 16 are formed. However, in practice, the end of the axial AD of the slit 16 is located on the outline of the region 15 of the outlet port 12. That is, the outline of the region 15 of the outlet port 12 can be defined by connecting the ends of the axial AD of the adjacent slits 16.

The shape of the region 15 is not limited to the substantially pentagonal shape described above. That is, according to the specification of the spool valve 1, the region 15 may be constituted only of the first part 17 or only of the second part 18.

As shown in FIG. 5C, the outlet port 12 may be formed over the entire circumferential direction CD while having a predetermined width in the axial direction AD. In this case, the slits 16 are formed in the entire area of the circumferential direction CD at predetermined intervals in the circumferential direction CD.

A through hole 50 is formed in the outer peripheral surface 10a of the sleeve 10. The through hole 50 extends in the radial direction RD and connects with a flow passage 47 formed in the housing 40. The through hole 50 also connects with the housing hole 13. Accordingly, the working fluid flows through the through hole 50 between the second land section 22 and the sleeve 10. The working fluid also flows through the same through hole (not shown) between the first land section 21 and the sleeve 10. By allowing the working fluid to flow into these gaps, the fluid from the inlet passage 41 into the gaps is prevented, and the spool 20 is prevented from sticking due to the inflow of potential contaminants.

The flow passage 47 is connected to the inlet passage 41 or a flow passage (not shown) connected to the inlet passage 41. The flow passage 47 is a flow passage in which cleanliness is maintained by a filter having a small pressure drop which is intentionally redundantly connected to the flow passage. Therefore, the pressure in the flow passage 47 is equal to the pressure in the inlet passage 41. The flow passage 47 may be connected to the outlet passage 42 or the flow passage (not shown) connected to the outlet passage 42. In this case, the fluid flowing through the flow passage 47 is relatively smaller in amount than the fluid flowing through the inlet passage 41 by the filter described above. Therefore, the pressure in the flow passage 47 is equal to the pressure in the outlet passage 42.

As shown in FIG. 3, protrusions 51 are provided on the outer peripheral surface 10a of the sleeve 10. Each protrusion 51 protrudes radially outward and is formed in an annular shape around the axis 2 as the center. The protrusion 51 has a groove 52 recessed inwardly in the radial direction RD. A seal member 53 such as an O-ring (see FIG. 2) is attached into the groove 52. When the spool valve 1 is inserted into the mounting hole 43, the seal member 53 is pressed against the inner peripheral surface 43a of the mounting hole 43 formed in the housing 40 due to its elastic deformation. Thereby, the space (clearance) between the sleeve 10 and the housing 40 is partitioned, and leakage of the working fluid having flowed into the partitioned space can be prevented. Further, the position of the sleeve 10 in the mounting hole 43 is stably maintained by the pressure contact of the seal member 53.

As shown in FIG. 3, the tip end portion 10b of the sleeve 10 is provided with a washer (lid member) 55. The washer 55 is a disk covering the housing hole 13, and a pressure detecting port 56 is formed in the center thereof. As shown in FIG. 1, the pressure detecting port 56 penetrates the washer 55 in the axial direction AD, and connects between the pressure detecting passage 45 and the housing hole 13. The washer 55 may be provided separately from the sleeve 10, or may be integrally formed with the sleeve 10 as a tip end surface of the sleeve 10 from a single base material. The pressure detecting passage 45 is connected to the inlet passage 41 or a flow passage (not shown) connected to the inlet passage 41. Therefore, the pressure in the pressure detecting passage 45 is equal to the pressure in the inlet passage 41.

Next, the spool 20 will be described.

The spool 20 is a rod-shaped member having a circular cross section. The spool 20 extends in the axial direction AD from a base end 20a thereof to a tip end 20b thereof. As shown in FIG. 1, the spool 20 is movably (reciprocatably) housed in the housing hole 13 in the axial direction AD, wherein the housing hole 13 is formed in the sleeve 10.

The spool 20 includes a first land section (large-diameter portion) 21, a second land section (large-diameter portion) 22, and a groove section (small-diameter portion) 23. The first land section 21 and the second land section 22 are arranged in the axial direction AD with the groove section 23 between them. The first land section 21 and the second land section 22 have outer diameters substantially equal to (i.e., slightly smaller than) the inner diameter of the housing hole 13. The first land section 21 is located between the pressure detecting port 56 (washer 55) and the inlet port 11 in the axial direction AD. On the other hand, the second land section 22 is located at a position where the outlet port 12 can be closed by the movement of the sleeve 10. Grooves (so-called labyrinth grooves) (not shown) are formed on the outer peripheral surface 21a of the first land section 21 and the outer peripheral surface 22a of the second land section 22 to prevent the hydraulic fluid from sticking (Hydraulic Lock).

The groove section 23 has a width in the axial direction AD that allows the connection between the inlet port 11 and the outlet port 12. The groove section 23 forms a flow passage of the working fluid in the groove section 23. The groove section 23 is recessed radially inward from the outer peripheral surface of the spool 20, and extends over the entire circumferential direction CD. Therefore, as viewed from the axial direction AD, the groove section 23 is formed in an annular shape centered on the axis 2.

The inner surface of the groove section (small-diameter portion) 23 includes a cylindrical surface (intermediate part) 24, a first annular surface (expanded-diameter part) 25, and a second annular surface (expanded-diameter part) 26. The cylindrical surface 24 has a constant diameter and extends in the axial direction AD around the axis 2 as the center.

The first annular surface 25 extends while curving from the cylindrical surface 24 toward the outer peripheral surface 21a of the first land section 21, and is connected to the outer peripheral surface 21a. The first annular surface 25 gradually deflects the flow of the working fluid, which has flowed into the groove section 23 from the inlet port 11, from the radial direction RD to the axial direction AD.

The second annular surface 26 extends while curving from the cylindrical surface 24 toward the outer peripheral surface 22a of the second land section 22, and is connected to the outer peripheral surface 22a. The second annular surface 26 gradually deflects the flow of the working fluid, which will flow out from the groove section 23 to the outlet port 12, from the axial direction AD to the radial direction RD. The continuous deflection by each annular surface suppresses the excessive impact of the working fluid against the groove section 23 and reduces the excessive pressure on the spool 20 caused by the impact.

The groove section 23 moves in the axial direction AD with the movement of the spool 20. Depending on the position of the groove section 23, a connection between the inlet port 11 and the outlet port is made through the groove section 23, or the connection between the inlet port and the outlet port 12 is terminated. The flow rate of the working fluid is adjusted by changing the opening area of the groove section 23 relative to the outlet port 12.

Next, the biasing device 30 will be described.

The biasing device 30 biases the base end 20a of the spool 20 toward the tip end 20b (i.e., toward the closing direction of the valve). As shown in FIG. 2, the biasing device 30 includes a spring 31 as a biasing member, a pair of retainers 32 and 32, and an operation part (handle) 33. The spring 31 presses the base end 20a of the spool 20 toward the tip end 20b of the spool. The spring 31 is a so-called compression coil spring and has a spring coefficient that produces a predetermined range of biasing forces. The spring 31 is held from both sides of the axial direction AD by the pair of retainers 32 and 32 and is housed in the operation part 33.

The operation part 33 is a hollow and bottomed cylindrical member. The operation part 33 has a housing section 34 opening toward the spool 20. The housing section 34 houses the spring 31 and the pair of retainers 32 and 32. A screw thread 35 is formed on an outer peripheral surface 33a of the operation part 33. The screw thread 35 is screwed into a screw groove 44 formed on an inner peripheral surface 43a of the mounting hole 43. Accordingly, the operation part 33 moves in the axial direction AD by the rotation thereof about the axis 2. An annular groove 37 is formed in a part of the outer peripheral surface 33a of the operation part 33 between an edge portion 36 of the operation part 33 facing the spool 20 and the screw thread 35 (see FIG. 3). A seal member 53 is attached to the groove 37. When the operation part 33 is inserted into the mounting hole 43, the seal member 53 is pressed toward the inner peripheral surface 43a of the mounting hole 43. The elastic deformation of the pressed seal member 53 prevents leakage of the working fluid from between the outer peripheral surface 33a of the operation part 33 and the inner peripheral surface 43a of the mounting hole 43.

Regardless of the position of the operation part 33, the housing section 34 of the operation part 33 connects with a drain flow passage 46. The drain flow passage 46 is connected to the outlet passage 42 or the flow passage (not shown) connected to the outlet passage 42, through an orifice (not shown). Accordingly, the pressure in the housing section 34 slowly changes to maintain equilibrium with the pressure in the outlet passage 42. A groove (notch) 38 may be formed at the edge portion 36 of the operation part 33. With the formation of the groove 38, even when the edge portion 36 of the operation part 33 comes into contact with the spool 20, communication between the drain flow passage 46 and the housing section 34 is maintained.

By rotating the operation part 33, the operation part 33 approaches the sleeve 10 or leaves from the sleeve 10. When the operation part 33 is brought close to the sleeve 10, the spring 31 contracts, and the biasing force of the spring 31 and the pressure in the operation part 33 are transmitted to the spool 20 through the retainer 32. Accordingly, it is possible to adjust the pressure in the spool valve 1 by adjusting the rotation number of the operation part 33. In the present embodiment, the pressure can be set only by the mechanical operation which is only the rotation of the operation part 33. That is, the electric control using a solenoid or the like is unnecessary.

Next, the operation of the spool valve 1 will be described.

The operation of the spool valve 1 according to the present embodiment as a pressure control valve or a flow control valve is basically the same as that of a conventional pressure control valve or a flow control valve equipped with a spool. That is, the position of the spool 20 is determined according to the difference between the pressure applied to the spool 20 by the biasing device 30 and the pressure of the working fluid in the pressure detecting port 56, and the opening area (opening degree) of the outlet port 12 is determined according to the position thus determined.

When the flow rate of the working fluid flowing out from the outlet port 12 increases, the contraction of the spring 31 increases, and the biasing force in the flow rate also increases. The flow force due to the jet at the outlet port 12 also increases in accordance with the increase of the flow rate. Therefore, when the spool valve 1 is in the open state, the pressure of the working fluid increases as the flow rate increases (override property). However, when the spool valve 1 functions as a pressure control valve or a flow rate control valve, it is desirable for the spool valve 1 to be able to control the pressure of the working fluid at a constant level as the flow rate increases or decreases.

Therefore, in the present embodiment, the outlet port 12 is formed of the slits 16. The existence of these slits 16 disperses the jet of working fluid generated at the outlet port 12, decelerates the jet, and reduces the axial component of the flow. As a result, the flow force in the axial direction AD, which acts to close the valve, is reduced, and thus the override property are improved.

Figure 6A:
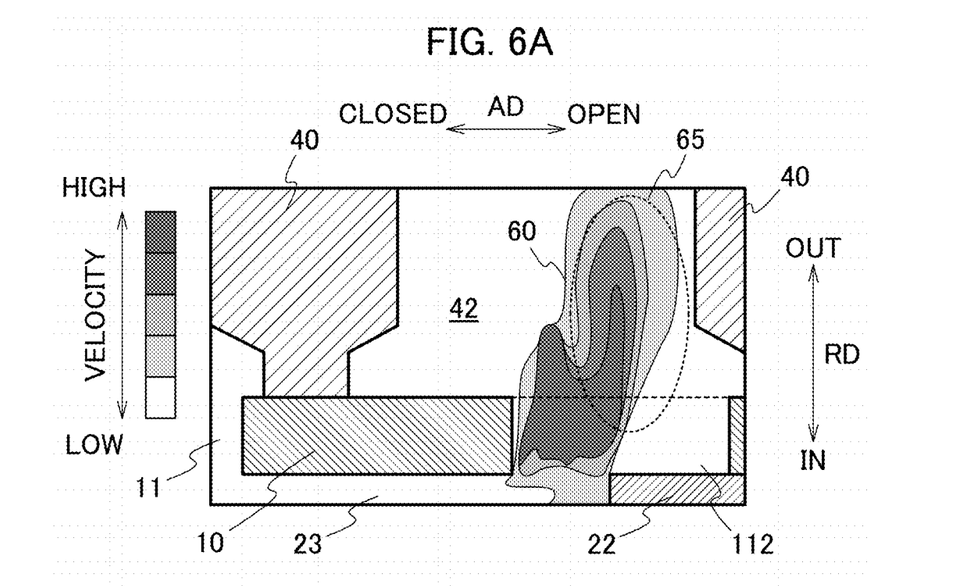
FIG. 6A shows a velocity distribution of a jet in the comparative example.
Figure 6B:
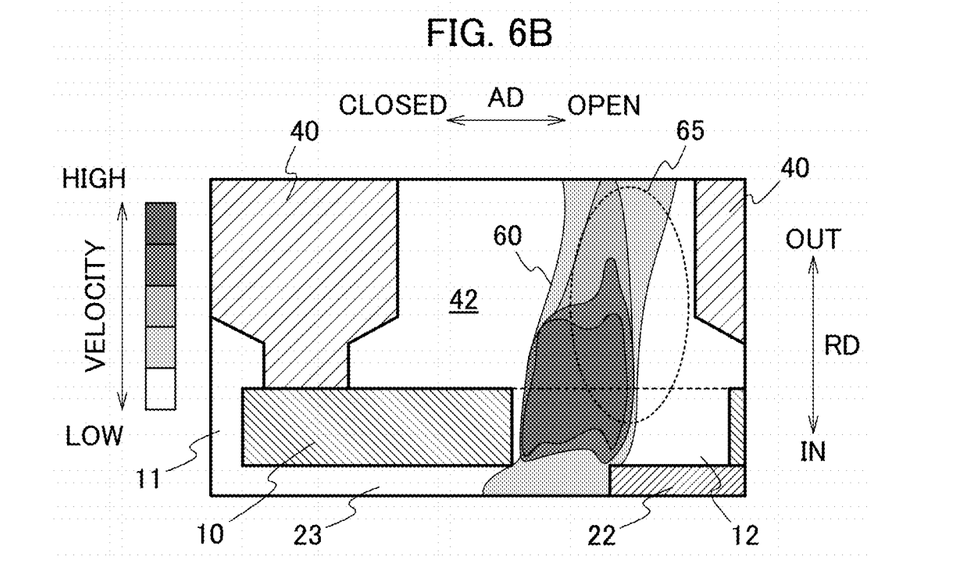
FIG. 6B shows a velocity distribution of a jet in the present embodiment.

FIGS. 6A and 6B is a diagram showing a numerical analysis result using Computational Fluid Dynamics (CFD) on the velocity distribution of a jet on a cross section including the axis 2. FIG. 6A shows a velocity distribution of a jet in a comparative example. FIG. 6B shows the velocity distribution of a jet in the present embodiment. As described above, the outlet port 12 of the present embodiment is constituted of the slits 16. On the other hand, the outlet port 112 of the comparative example is formed as a single opening. However, its outer shape is the same as that of the outlet port 12. In addition, the opening area of the outlet port in both analyses is set to the same value, which is half of the opening area when the outlet port is fully open.

As shown in FIGS. 6A and 6B, the jet 60 of the working fluid flows generally outward in the radial direction in both analysis results, but the jet 60 is slightly inclined toward the opening direction of the spool valve 1 (to the right in the figures). However, the inclination of the jet 60 toward the opening direction shown in FIG. 6B is smaller than the inclination of the jet 60 toward the opening direction shown in FIG. 6A. Further, both figures show regions 65 at the same position surrounded by dotted lines. When comparing the velocity distributions in these regions 65, in FIG. 6A, a flow with a relatively large velocity occurs over a wide area, while in FIG. 6B, a flow with a similar velocity decreases and its distribution shrinks.

The velocity component of the jet 60 toward the opening direction of the spool valve 1 contributes to the flow force in the axial direction AD acting in the closing direction of the spool valve 1. Therefore, FIG. 6B shows a decrease of the velocity component contributing to the flow force in the axial direction AD among the velocity components of the jet 60.

Figure 7A:
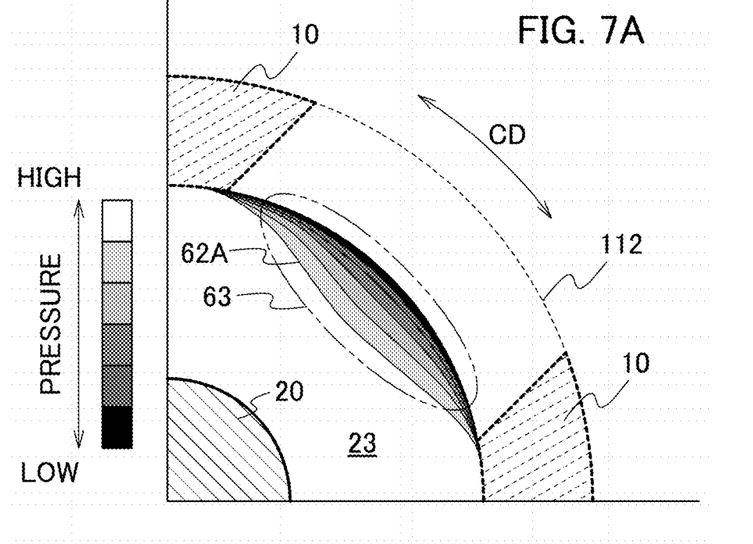
FIG. 7A shows the static pressure distribution in the comparative example.
Figure 7B:
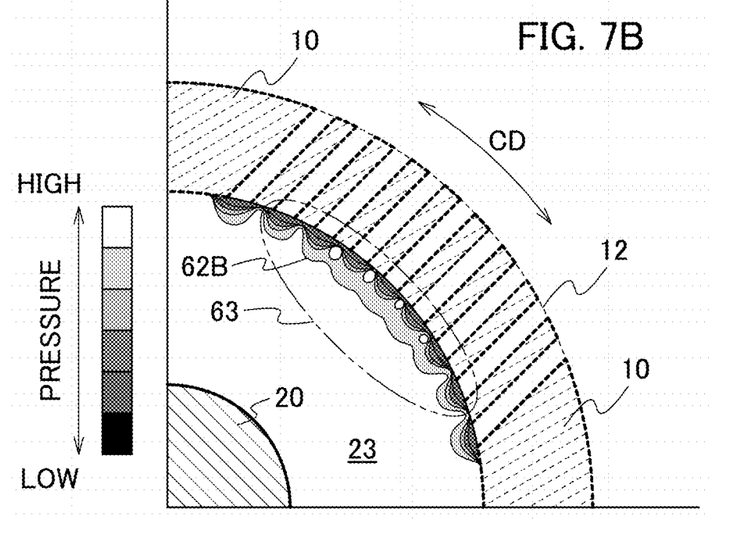
FIG. 7B shows the static pressure distribution in the present embodiment.

FIGS. 7A and 7B are diagrams showing numerical analysis results using CFD of the static pressure distribution in the groove section 23 near the outlet port on the cross section orthogonal to the axis 2. FIG. 7A shows the static pressure distribution in the comparative example, and FIG. 7B shows the static pressure distribution in the present embodiment. The configuration of the comparative example shown in FIG. 7A is the same as that assumed in FIG. 6A. In both figures, the change in static pressure is indicated by the shade of color, and the darker the area (darker the black), the lower the static pressure.

Focusing on the region 63 surrounded by the two-dot chain line, it can be seen that the low-pressure region 62B shown in FIG. 7B is smaller than the low-pressure region 62A shown in FIG. 7A. In addition, FIG. 7A shows an area (i.e., the darkest area) with the most significant pressure drop distributed near the boundary between the groove section 23 and the outlet port 12. On the other hand, FIG. 7B does not show the distribution of such region.

A decrease in static pressure in a certain region means an increase in dynamic pressure in that region. That is, a decrease in static pressure indicates an acceleration of the working fluid in that region. On the other hand, as shown in FIGS. 6A and 6B, the vicinity of the boundary between the groove section 23 and the outlet port 12 is the origin of the jet of the working fluid. Therefore, the reduction of the low-pressure region 62B shown in FIG. 7B indicates a decrease in the velocity of the jet 60 of the working fluid, that is, a decrease in the flow force.

Figure 8:
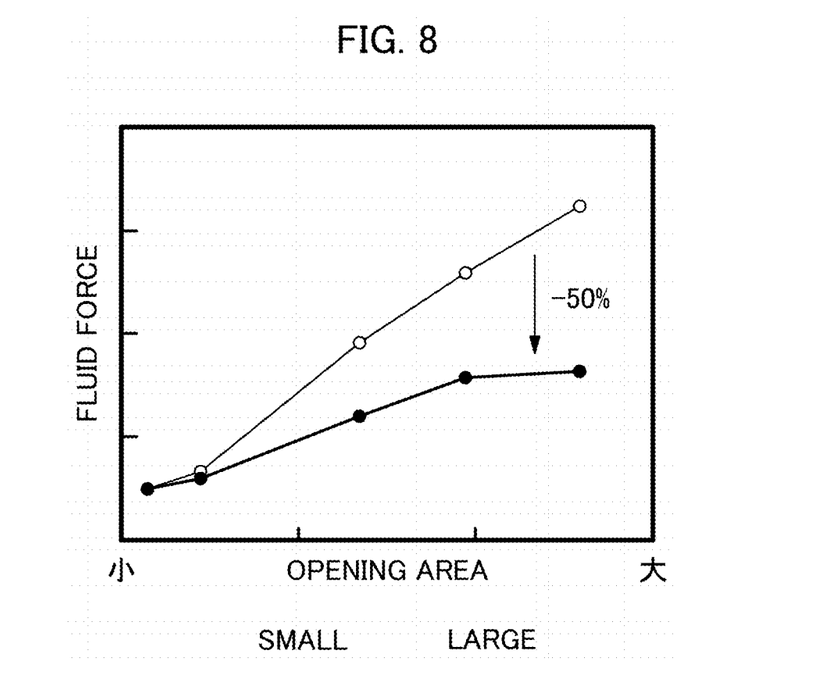
FIG. 8 is a graph showing a variation of the flow force with respect to the opening area of the outlet port.

FIG. 8 is a graph showing a variation of the flow force with respect to the opening area of the outlet port. The white circle in the figure indicates the value obtained by the configuration of the comparative example described above, and the black circle in the figure indicates the value obtained by the configuration of the present embodiment. These values were obtained by numerical analysis using CFD. As shown in FIG. 8, the flow force generated by the configuration of the present embodiment is lower than that generated by the configuration of the comparative example, regardless of the opening area of the outlet port. The percentage of this reduction increases as the opening area of the outlet port increases. For example, when the outlet port is fully open, the flow force is found to be reduced by about 50%.

Thus, according to the present embodiment, the flow force in the axial direction can be reduced compared to the case where the outlet port is composed of a single opening having the same opening area. That is, according to the present embodiment, the influence of the flow force on the override property of the pressure control valve or the flow control valve can be suppressed.

The reduction of the flow force in the axial direction is obtained by constituting the outlet port with the slits. That is, in order to deflect the jet of the working fluid, it is not necessary to form a locally changed shape such as a recess on the inner surface of the groove section of the spool, as conventionally seen.

When the surface facing the working fluid is provided with a part such as a small recess, the foreign matter in the working fluid tends to adhere to the part. The adhesion of the foreign matter disturbs the deflection of the jet. However, the present embodiment does not require such a locally changed shape. Therefore, the original performance of the spool valve can be maintained for a long time even in an environment where foreign matter is likely to be mixed into the working fluid.

It should be noted that the present disclosure is not limited to the embodiments described above, is shown by the description of the claims, and further includes all modifications within the meaning and scope of the same as the description of the claims.

What is claimed is:

1. A spool valve comprising:
a sleeve extending in an axial direction thereof, including an inlet port and outlet ports for working fluid;
a spool movably housed in the sleeve in the axial direction;
a biasing device including a biasing member configured to press a base end of the spool toward a tip end of the spool; and
a pressure detecting port for the working fluid, opening toward the tip end of the spool;
wherein the outlet ports are arranged at first intervals in a circumferential direction of the sleeve,
each of the outlet ports comprises a corresponding plurality of slits,
for each of the outlet ports, the corresponding plurality of slits are arranged at second intervals in the circumferential direction and extend in the axial direction, and
the first intervals are greater than the second intervals.

2. The spool valve according to claim 1, wherein
each of the outlet ports is sectioned into a first part and a second part located further from the inlet port than the first part, and
a width of the first part of the sleeve along the circumferential direction increases as it approaches the second part, and
a width of the second part of the sleeve along the circumferential direction is constant.

3. The spool valve according to claim 1, wherein
the slits in each of the outlet ports are parallel to a virtual plane including a center axis of the spool.

* * * * *